(12) United States Patent
Kalhour (10) Patent No.: US 7,150,020 B2
(45) Date of Patent: Dec. 12, 2006

(54) RESOURCE MANAGEMENT

(75) Inventor: Morteza Kalhour, Linköping (SE)

(73) Assignee: Nokia Corporation, Espoo (FI)

( * ) Notice: Subject to any disclaimer, the term of this patent is extended or adjusted under 35 U.S.C. 154(b) by 716 days.

(21) Appl. No.: 09/882,459

(22) Filed: Jun. 14, 2001

(65) Prior Publication Data

US 2002/0007408 A1    Jan. 17, 2002

(30) Foreign Application Priority Data

Jun. 30, 2000    (GB)   ............................ 0016152.1

(51) Int. Cl.
*G06F 13/00* (2006.01)
(52) U.S. Cl. ............... 718/104; 718/102; 718/103; 709/226
(58) Field of Classification Search ........ 718/102–104; 709/226
See application file for complete search history.

(56) References Cited

U.S. PATENT DOCUMENTS

| | | | | |
|---|---|---|---|---|
| 5,377,352 A | * | 12/1994 | Tanaka et al. | 718/103 |
| 5,748,468 A | * | 5/1998 | Notenboom et al. | 700/3 |
| 5,991,793 A | * | 11/1999 | Mukaida et al. | 718/104 |
| 6,009,426 A | | 12/1999 | Jouenne et al. | 707/8 |
| 6,253,273 B1 | * | 6/2001 | Blumenau | 710/200 |
| 6,330,612 B1 | * | 12/2001 | Boonie et al. | 709/229 |
| 2002/0029213 A1 | * | 3/2002 | Borissov et al. | 707/7 |

FOREIGN PATENT DOCUMENTS

| | | |
|---|---|---|
| EP | 0 543 560 A2 | 11/1992 |
| EP | 0 576 764 | 1/1994 |
| GB | 2 304 211 | 3/1997 |
| GB | 2 318 894 | 5/1998 |
| JP | 5 120 041 | 5/1993 |

* cited by examiner

*Primary Examiner*—William Thomson
*Assistant Examiner*—Qing-Yuan Wu
(74) *Attorney, Agent, or Firm*—Banner & Witcoff, Ltd.

(57) ABSTRACT

A resource management system comprises a number of software modules running in a multi-application environment, in which an application with which the user is currently interacting is designated as a focus application. The focus application is favored during resource conflict resolution procedures, so that a resource will pass ownership of itself to a focus application where the current application does not object to it doing so, without involving higher level components. Where the current application does object, the resource involves higher level components to perform conflict resolution.

13 Claims, 10 Drawing Sheets

RESOURCE MANAGEMENT

FIELD OF THE INVENTION

The present invention relates to the field of resource management, particularly but not exclusively to resolving conflicts between two or more software applications requesting access to the same resource.

BACKGROUND

A conventional computer has a number of resources such as the display, sound system, memory devices, hard disk drive and so on, which can be used by any of the applications running on the system. However, the resources can only serve a limited number of applications at the same time, so that in a multi-application environment, there is a need for a resource management system which is more flexible, manageable and at the same time more user friendly than that in a conventional computer.

SUMMARY OF THE INVENTION

According to the present invention, there is provided a method of resolving conflicts in the allocation of a shared resource between a first application to which the resource is currently allocated and a second application requesting access to the resource, including determining whether the second application is a predetermined favoured application.

By determining whether the application requesting the resource is a predetermined favoured application, an application which is currently in focus, for example the application which is currently prioritised by the user, can be considered for resource allocation, while other applications are rejected.

Preferably, in the event that the second application is the predetermined favoured application, the method includes determining whether the resource has the authority to permit allocation to the second application. In the event that the resource does have the authority to permit allocation, the method preferably comprises allocating the resource to the second application.

By permitting the resource to allocate itself to the second application where there is no barrier to it doing so, an efficient resource allocation procedure results with no need to involve higher level components in the decision making process. However, in the event that the resource does not have the authority to permit allocation, the method can comprise requesting a decision as to whether to allocate the resource. The decision can involve higher level components which have an overview of the system resources. The decision can depend on predetermined priorities assigned to the first and second application or it can depend on user input.

According to the present invention, there is also provided a method of allocating a shared resource between a plurality of applications requesting access to the resource, comprising selecting an application that is to be favoured during resource allocation and communicating information identifying the favoured application to the resource.

According to the present invention, there is further provided a resource management system for allocating a shared resource between a plurality of applications requesting access to the resource, wherein, in determining the allocation of the resource between a first application to which the resource is currently allocated and a second application requesting access to the resource, the resource is configured to determine whether the second application is the favoured application.

The present invention further provides a program for execution by a processor, to implement conflict resolution in the allocation of a shared resource between a first application to which the resource is currently allocated and a second application requesting access to the resource, including program code for determining whether the second application is a predetermined favoured application.

BRIEF DESCRIPTION OF THE DRAWINGS

Embodiments of the invention will now be described by way of example with reference to the accompanying drawings, in which.

DETAILED DESCRIPTION

Figure 1:
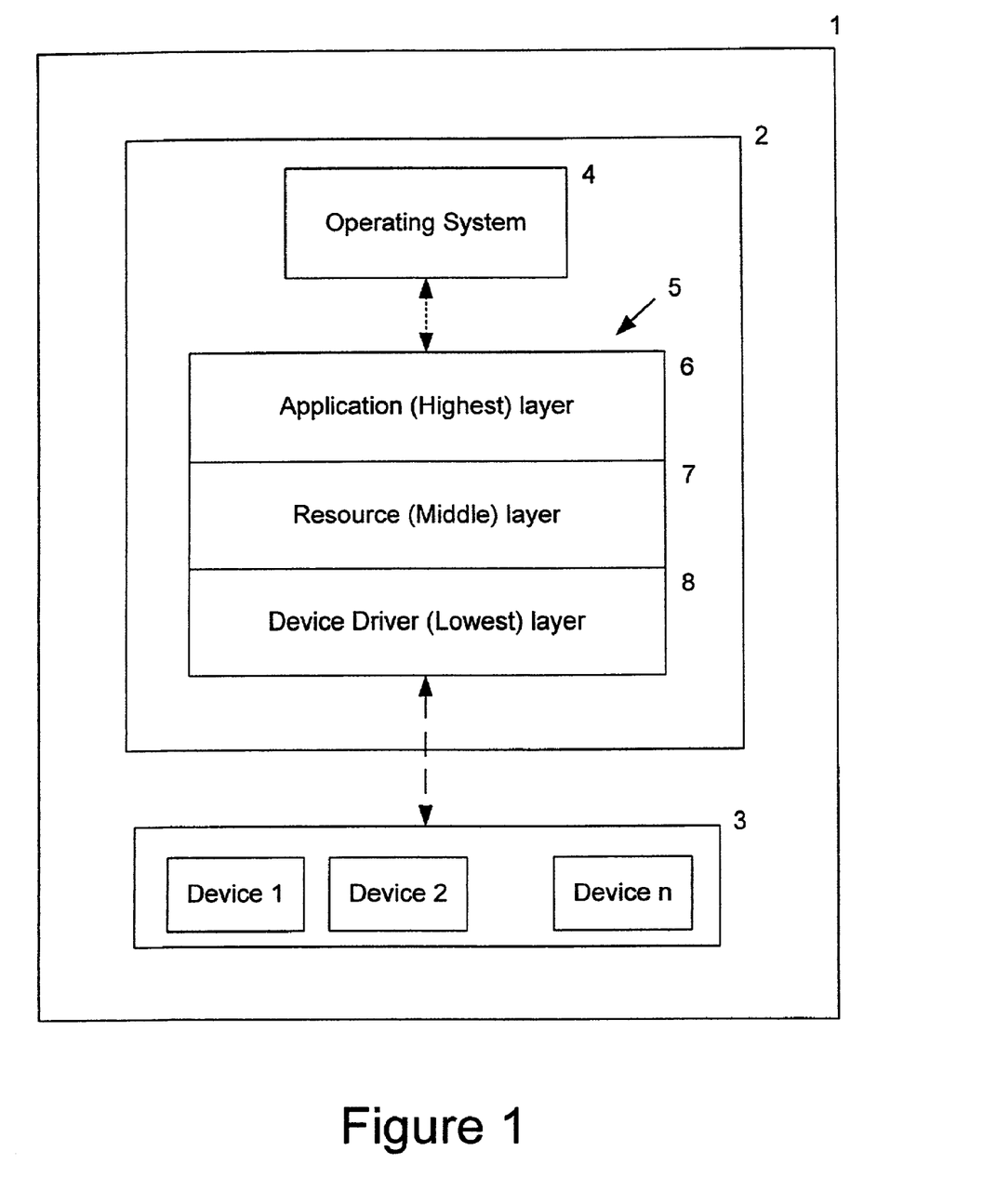
FIG. 1 is a schematic diagram of a computer system including a representation of the software according to the invention in the form of a layer model.

FIG. 1 is a schematic diagram of a computer 1 which comprises computer software 2 and computer hardware 3. The software 2 includes operating system software 4 and resource management software 5, represented in terms of a layer model 6, 7, 8 which comprises an application (highest) layer 6, a resource (middle) layer 7 and a device driver (lowest) layer 8.

Figure 2:
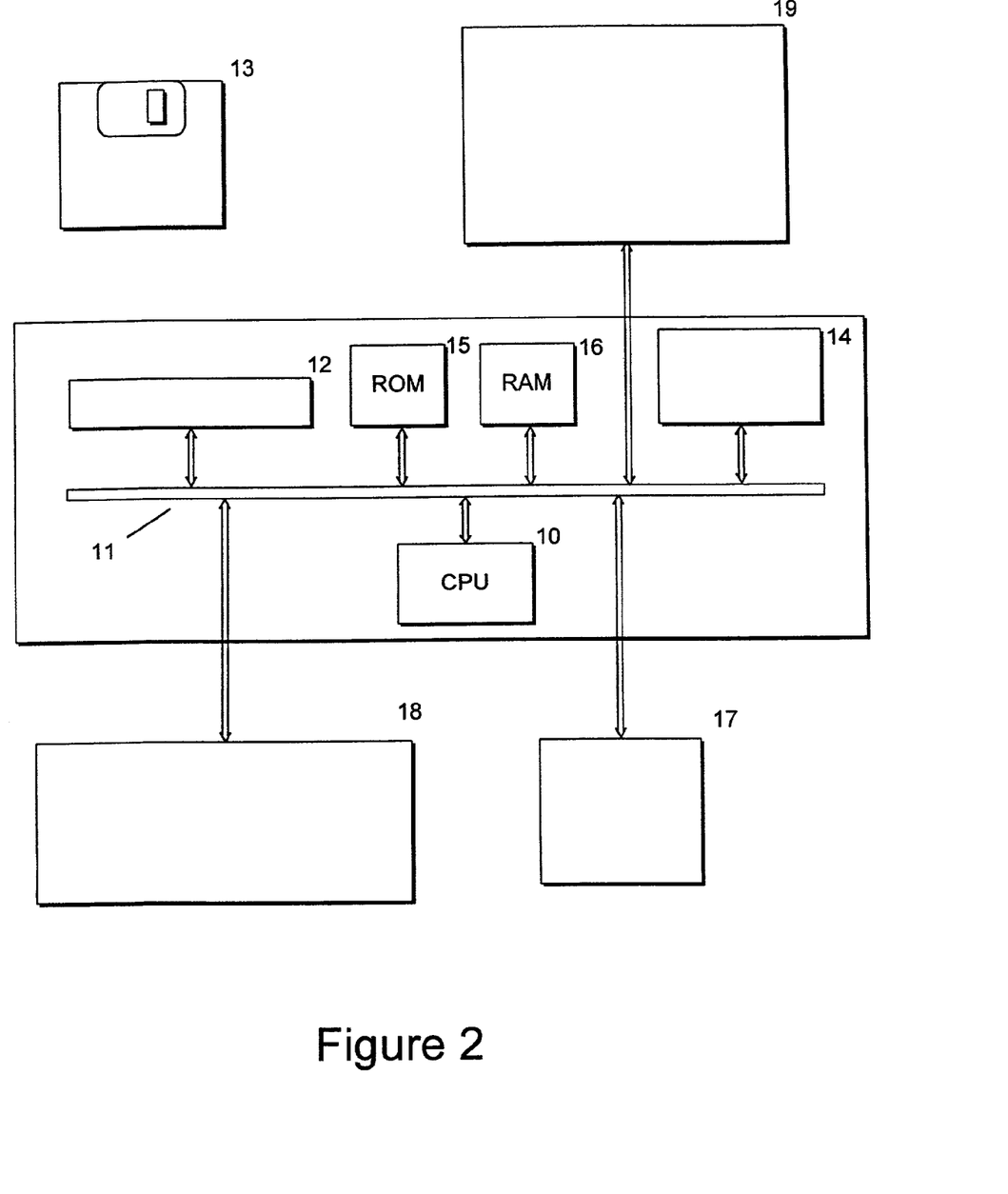
FIG. 2 is a schematic diagram showing details of the computer system in FIG. 1.

FIG. 2 illustrates in more detail the hardware devices shown in FIG. 1. The computer 1 comprises a central processing unit (CPU) 10 for executing computer programs and managing and controlling the operation of the computer. The CPU 10 is connected to a number of devices via a bus 11, the devices including a read/write device 12, for example a floppy disk drive for reading and writing data and computer programs to and from a removable storage medium such as a floppy disk 13, a storage device 14, for example a hard disk drive for storing system and application software, and memory devices including ROM 15 and RAM 16. The computer further includes user input/output devices, such as a mouse 17, keyboard 18 and display 19. It will be understood that the computer hardware described above is entirely conventional and that other variations are possible, for example, the computer may be provided with a communications device such as a modem and other forms of storage such as a CD-ROM and/or DVD drive. The computer runs operating system software 4 such as Linux with a desktop user environment such as Gnome or KDE.

Figure 3:
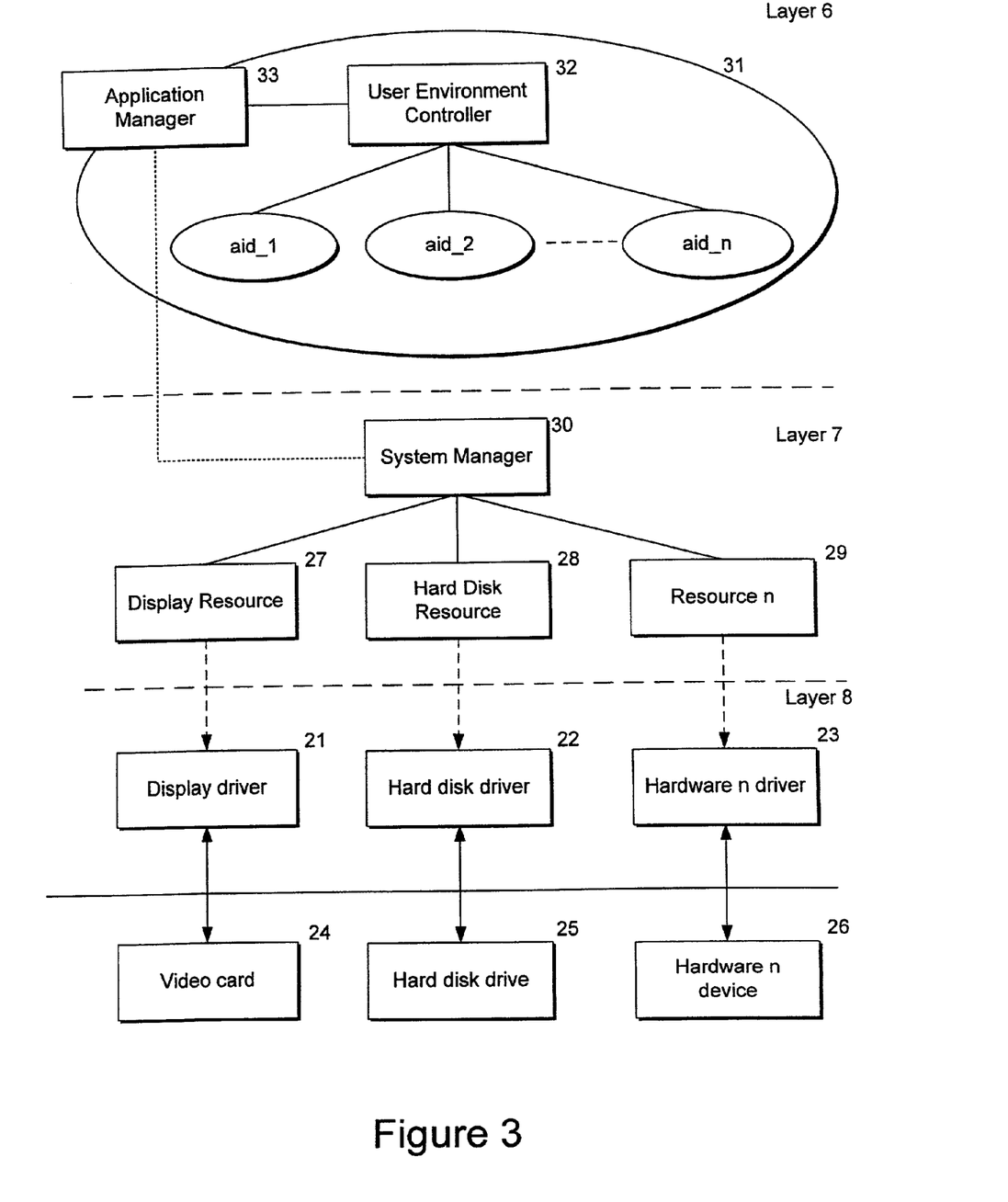
FIG. 3 is a schematic diagram illustrating the components existing at each layer of the layer model described in relation to FIG. 1.

Referring to FIG. 3, the software components existing at each of the layers 6, 7, 8 shown in FIG. 1 will now be described in detail, starting with the lowest layer 8.

The lowest layer 8 comprises a number of conventional software device driver modules, for example a display driver 21, hard disk driver 22 and a generalised 'hardware n' driver 23. As in a conventional computer system, each device driver controls an associated hardware device, for example a video card 24, hard drive 25 as well as a generalised 'hardware n' device 26.

The resource (middle) layer 7 comprises a number of software components each defining a resource, including a display resource 27, hard disk resource 28 and a generalised 'resource n' resource 29, under the control of a system manager 30. Each resource 27, 28, 29 implements resource management strategies in accordance with the invention by controlling the corresponding conventional device drivers 21, 22, 23 and using their functionality to control the associated hardware devices 24, 25, 26. It will be understood by a person skilled in the art that the resources at the middle layer are provided to enable the use of standard device drivers. In the event that standard device drivers are not needed, the functionality of the middle and lower layers 7, 8 can be combined, so that a resource would then provide the functionality of a device driver together with the resource management functionality in accordance with the invention. Similarly, it will be understood that a single resource can combine the functionality of a number of device drivers.

A system manager (SM) 30 is a middle layer software component that is responsible for creating all middle layer resources 27, 28, 29, and monitoring their functionality, and also implements specific resource management functions which will be described in detail below. At system start-up, the system manager 30 goes through a list of pre-registered middle layer resources and creates them. After creation, these resources offer their functionality to the applications in the application layer. The middle layer 27, 28, 29 resources effectively act as servers for the client applications in the application layer.

The application layer 6 includes a number of applications having application identifiers aid_1, aid_2 . . . , aid_n. An application identifier uniquely identifies an application and is used during the resource allocation procedure. Different processes within an application use the same application id for resource allocation. The totality of applications defines a user environment 31, for example the Gnome or KDE user environment, under the control of a user environment controller module 32 which has overall responsibility for the particular user environment 31 and is fully aware of all the configuration options and preferences set by the user, as well as knowing the identity of currently active applications. An application manager 33 coordinates the use of the middle layer 7 resources and includes APIs and configuration information that enable it to launch different user environments or switch between user environments.

Figure 4:
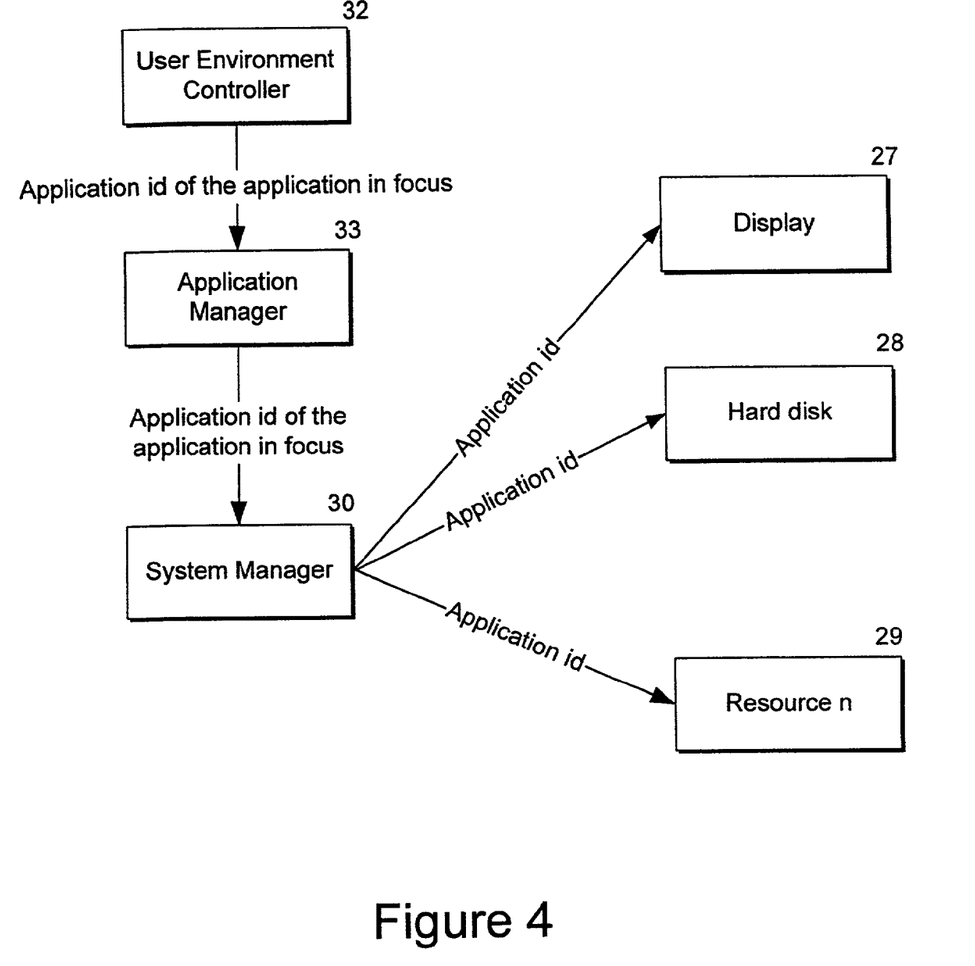
FIG. 4 is a schematic diagram illustrating the distribution of information relating to the focus application within the system according to the invention.

Referring to FIG. 4, the user environment controller 32 communicates the identity of an application referred to herein as the focus, or favoured, application to the application manager 33. The focus application is the application that is favoured when resources are allocated and used. For example, the focus application is the currently active application or an application that a user prioritises at a given time, which is typically but not necessarily the application with which the user is interacting at that time. An application in focus has the highest priority and does not lose its resources to any other application, although the focus changes dynamically between applications as the user performs different tasks within the user environment.

The application manager 33 forwards the identity of the focus application to the system manager 30. In turn, the system manager 30 communicates the focus application id to each of the resources 27, 28, 29. The system manager 30 is also responsible for informing the resources when the focus changes from one application to another.

Allocation Procedure

Figure 5:
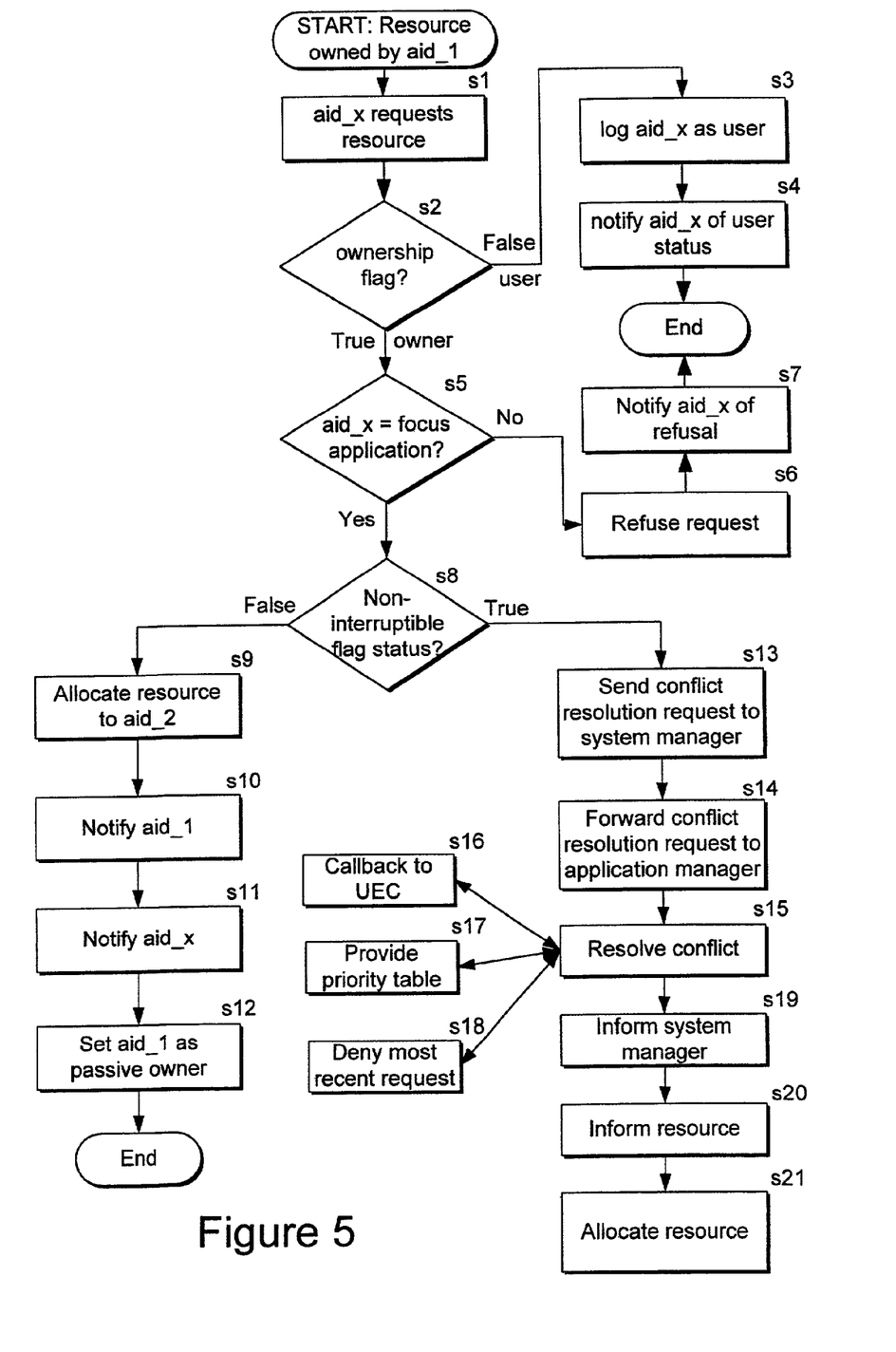
FIG. 5 is a schematic flow diagram illustrating a resource management procedure according to the invention.

FIG. 5 explains the process of resource management according to the invention, starting from the position that a given resource is owned by an application with application identifier aid_1, by reference to each of FIGS. 6 to 10 which illustrate the position when another application requests allocation of the resource, according to different scenarios.

In general terms, when an application wishes to request allocation of a resource 29 which is currently owned by another application, it issues a function call with three parameters:

Allocate (application id, non-interruptable flag, ownership flag).

The application id identifies the application making the request for the resource, in the general case, aid_x. The non-interruptable (NI) flag indicates how the application intends to use the resource if it is allocated the resource. If the flag is set to 'TRUE', ownership of the resource is not to be taken away from the application currently owning it without informing the application manager 33. If the flag is set to 'FALSE', the resource itself has the authority to pass ownership of itself to other applications in certain circumstances, which will be described in detail below. If the NI flag is described as having 'Don't care' status, this means that the flag may be set as either TRUE or FALSE, but that its status is irrelevant to the procedure in issue.

The ownership flag indicates how the requesting application intends to manage the resource. If the flag is set to TRUE, the requesting application intends to control the resource and therefore requires access to functions that can change the internal status of the resource. If the flag is set to FALSE, the requesting application wishes to be considered as a User only, in which mode it is only allowed to call functions that are not aimed at controlling the resource, and therefore cannot modify the resource's internal status.

A resource 29 is described with reference to FIGS. 6 to 10 as having an initial state 29A before the Allocate request and a final state 29B after the Allocate request. Each resource 29 is associated with a number of fields:

A non-interruptable flag (NI) indicates how the currently owning application uses the resource. Where the resource has changed hands as a result of an Allocate( . . . ) request as described above, the NI flag is set to the value specified in that request.

An Owner record stores the application identifier of the current owner of the resource.

A Users record stores the application identifier of any users of the resource. As described above, a user has limited access to the resource.

A Passive_Owners record stores the application identifier of any passive owners of the resource. A passive owner has the same level of accessibility to the resource as a user. The difference is that if the current application releases the resource and there is no other focus application requesting its ownership, the resource goes through its stack of passive owners and asks them whether they wish to regain control of the resource.

A Focus record records the application identifier of the focus application, communicated to the resource through the system manager 30, as described above with reference to FIG. 4.

Figure 6:
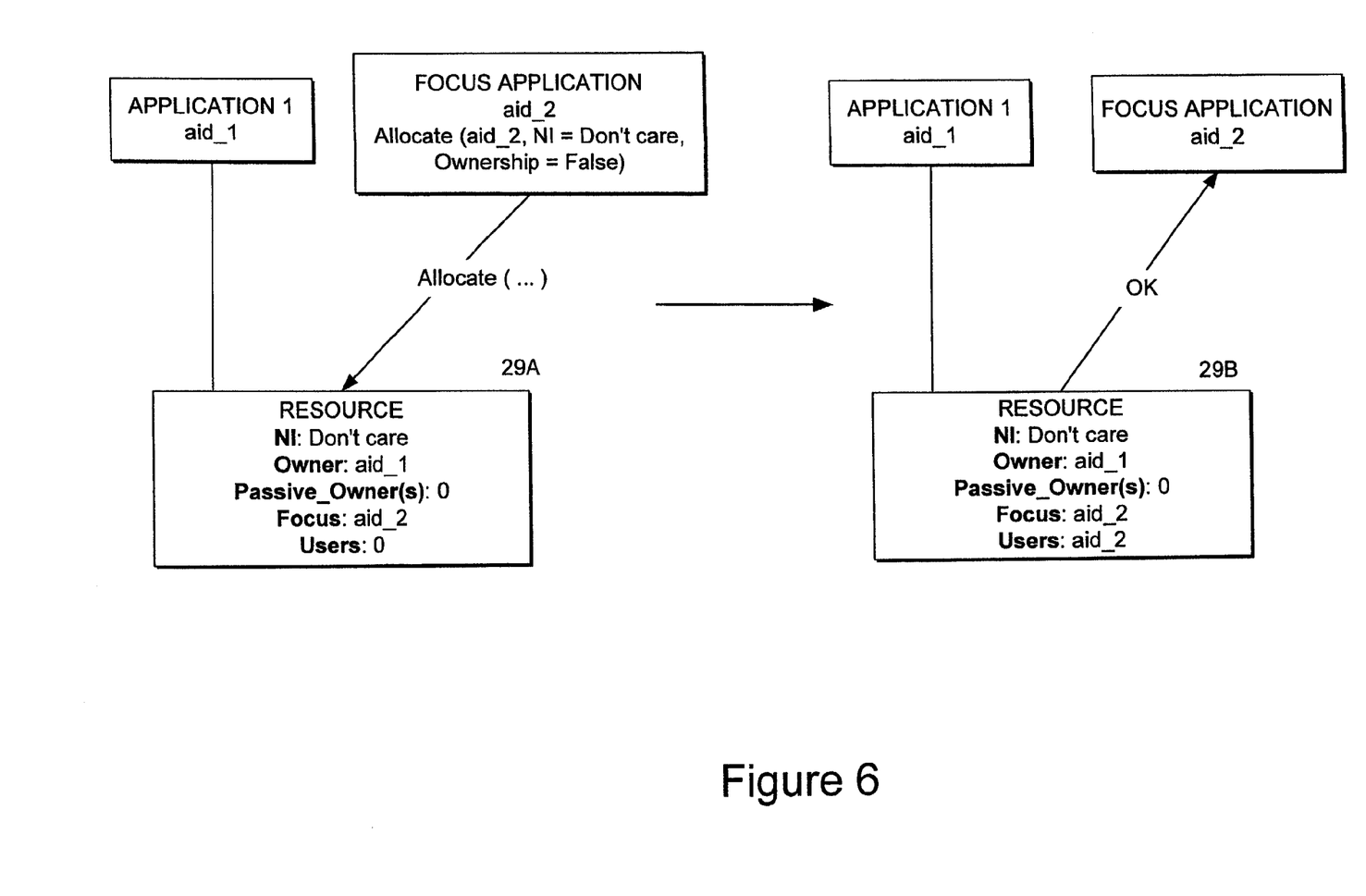
FIG. 6 is a schematic diagram illustrating an allocation request by a focus application in user mode.

FIG. 6 describes the situation in which the focus application requests the resource in user mode.

The initial state 29A of the resource 29 is that the Non-interruptable flag (NI) may be set to either TRUE or FALSE and the Owner record records that the resource 29 is currently owned by application aid_1. The identity of the focus application is aid_2.

The resource 29A further records that there are no passive owners and no users logged for the resource.

Referring to FIGS. 5 and 6, an application aid_x, where x=2, which is the current focus application, requests the resource 29 which is currently owned by application aid_1, so that the allocate request is in the form:

Allocate (aid_2, NI=Don't care, Owner=False) (step s1).

The resource 29 first looks at the ownership flag in the Allocate request (step s2). The fact that the ownership flag is set to FALSE indicates that application aid_2 is only requesting user status over the resource. As a result, aid_2 is logged as a user in the resource 29 (step s3), as shown in the final state 29B of the resource in FIG. 6 and this fact is notified to the focus application aid_2 (step s4).

Figure 7:
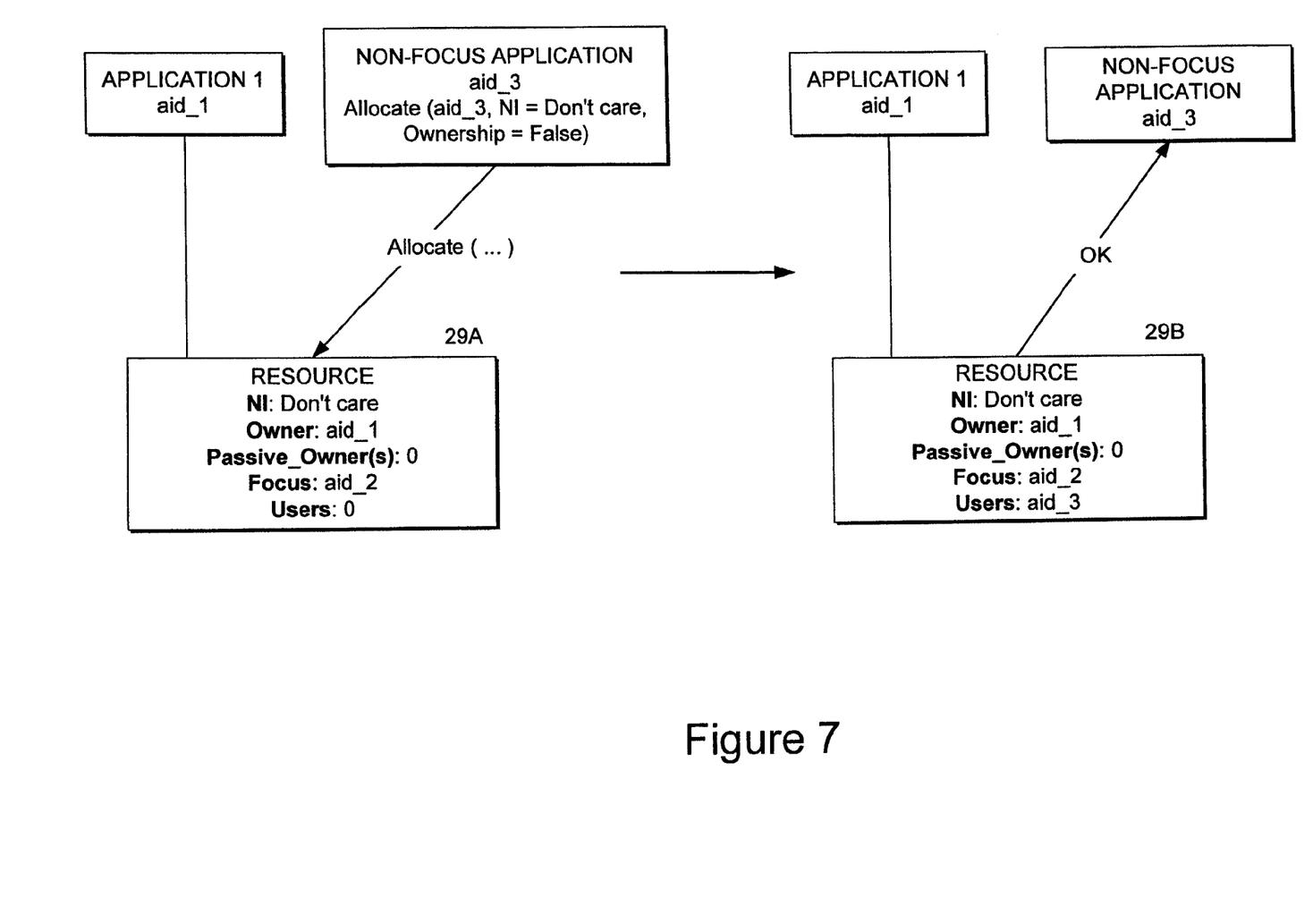
FIG. 7 is a schematic diagram illustrating an allocation request by a non-focus application in user mode.

It will be apparent from the above description that, in the case of a request to be logged as a user, the status of an application as a focus application or otherwise is irrelevant, since the resource 29 does not question the identity of the requesting application aid_2. Therefore, an application without focus status requesting user status is also granted this request in the same circumstances, as illustrated in FIG. 7 for a non-focus application aid_3.

Figure 8:
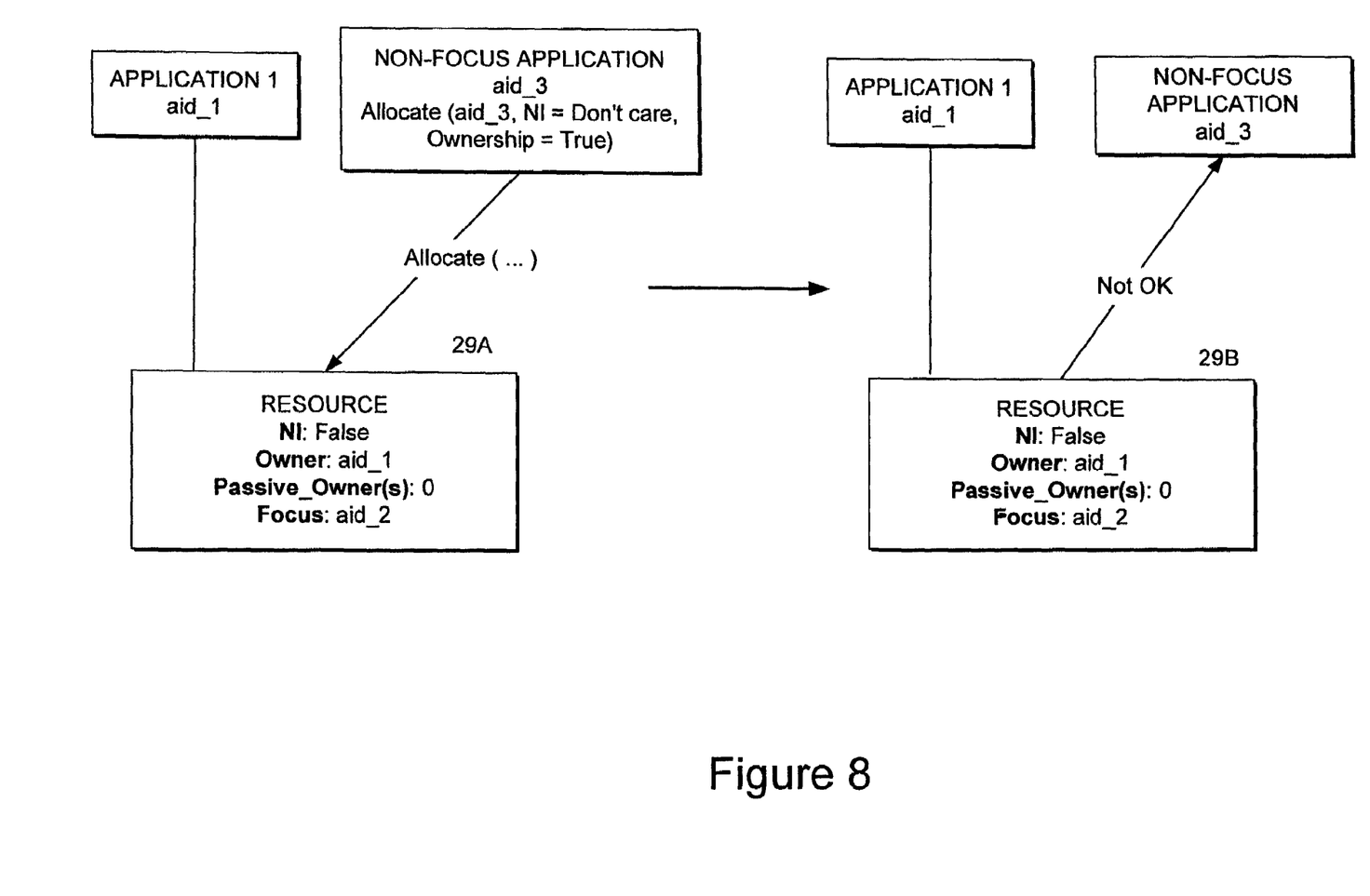
FIG. 8 is a schematic diagram illustrating an allocation request by a non-focus application in owner mode.

FIG. 8 illustrates the situation in which the application making the Allocate request is not a focus application, but the request is made with the ownership flag set:

Allocate (aid_3, NI=Don't Care, Owner=True) (step s1)

In this case, referring to FIG. 5, the resource 29 checks the ownership flag (step s2) and determines that the request is a request for ownership of the resource. The resource therefore checks the focus status of the application by comparing the identity of the requesting application notified in the Allocate request with the identity of the focus application stored by the resource 29 (step s5). In this case, the application making the Allocate request, aid_3, is not the focus application, which the initial state 29A of the resource shows to be aid_2. Therefore, the allocation request is refused (step s6) and the requesting application aid_3 notified of the refusal (step s7). FIG. 8 shows that there is no change between the initial 29A and final 29B states of the resource 29 in this case.

Figure 9:
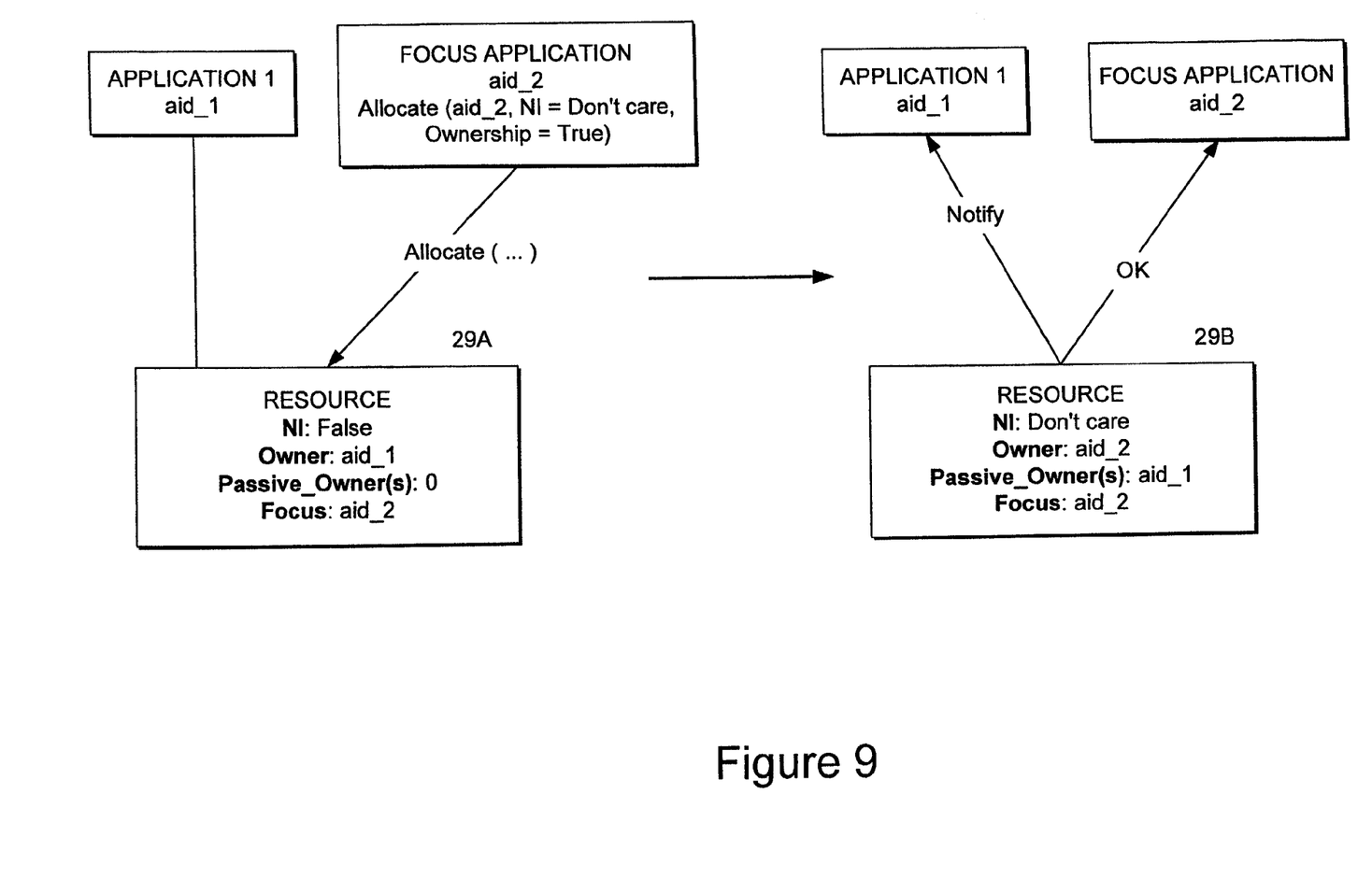
FIG. 9 is a schematic diagram illustrating an allocation request by a focus application in owner mode where the resource has the authority to perform allocation.

FIG. 9 illustrates the case where the focus application makes the resource allocation request in owner mode:

Allocate (aid_2, NI=Don't Care, Owner=True) (step s1)

As before, a check of the ownership flag by the resource (step s2) reveals that this is set to True, so the resource proceeds to check the focus status of the application (step s5). This indicates that the requesting application is the focus application, so the resource 29 proceeds to check the status of its non-interruptable flag (step s8). Since the non-interruptable flag at the resource 29 is set to False, the application aid_1 does not object to acquisition of the resource by the focus application. The resource 29 therefore has the authority to allocate itself to the requesting application aid_2 without reference to the application manager 33. The resource is therefore allocated to application aid_2 (step s9). The final state 29B of the resource now reflects that its owner is application aid_2. The resource notifies application aid_1 of the transfer of ownership (step s10) as well as notifying application aid_2 that ownership has been transferred (step s11). The resource also sets application aid_1 as a passive owner (step s12).

Figure 10:
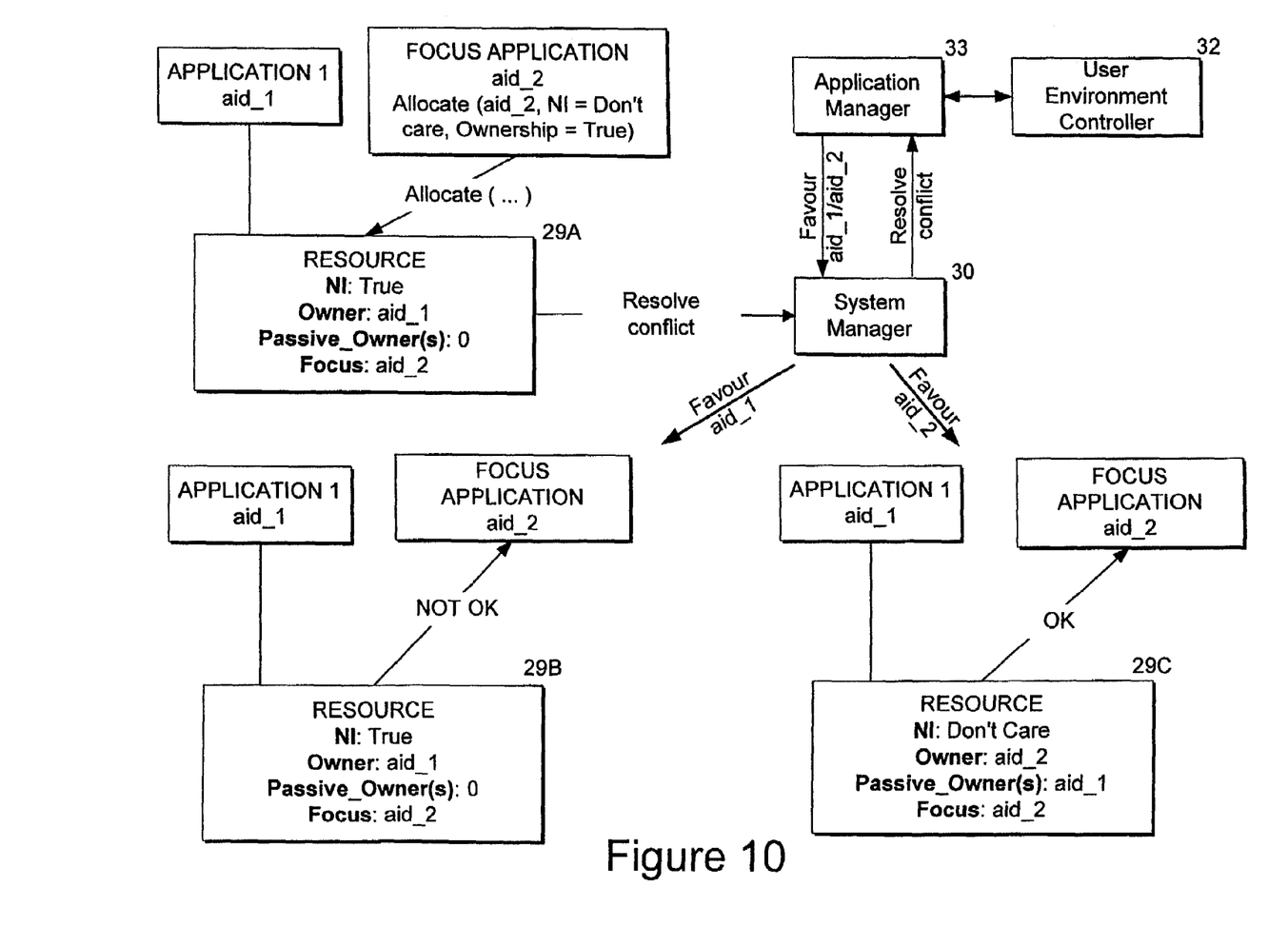
FIG. 10 is a schematic diagram illustrating an allocation request by a focus application in owner mode where the resource does not have the authority to perform allocation.

FIG. 10 illustrates the case where both the requesting focus application and the owning application require the resource in owner mode, i.e. the allocate request is in the form:

Allocate (aid_2, NI=Don't care, Owner=True) (step s1)

and the non-interruptable (NI) flag at the resource 29A is set to TRUE. The status of this flag indicates that the operations being performed by the currently owning non-focus application are critical, i.e. non-interruptible, so that the resource should not be allowed to allocate itself to the focus application without referring to a higher level authority.

Referring to FIG. 5, in this case, the procedure performed by the resource 29 is the same as that performed for the previous case, up to the point at which the NI flag is interrogated (step s8). The resource 29 determines that its NI flag is set to TRUE and therefore that the current owning application aid_1 does not wish to relinquish ownership of the resource, even to a focus application. As a result, the resource determines that it is unable to resolve the conflicting demands upon itself without reference to the application manager 33.

The resource 29 therefore sends a conflict resolution request to the system manager 30 (step s13) with the application ids, aid_1 and aid_2, of the two conflicting applications. The system manager 30 forwards the conflict resolution request to the application manager 31 (step s14). The application manager 33 then resolves the conflict (step s15).

Conflict resolution is done in one of a number of ways. For example, the application manager registers a call-back for conflict resolution with the user environment controller 32, which permits the user environment controller 32 to notify the application manager 33 how the conflict should be resolved (step s16). It is then up to the user environment controller 32 to decide how to resolve the conflict. One possibility is to use a hard coded priority list among applications, another to let the end user decide, for example by means of a dialog box. Alternatively, the user environment controller 32 provides the application manager 4 33 with a priority table, for example an array of executable application file names (step s17), and lets the application manager 33 resolve a conflict. In case neither a callback nor a priority list is provided to the application manager 33, the application manager 33 resolves the conflict according to its own set of rules, for example by denying the most recent resource request on the grounds that the older ongoing operation is more important (step s18).

When the conflict has been resolved by the application manager 33, it informs the system manager 30 of the outcome (step s19). The system manager 30 in turn informs the resource 29 of the outcome (step s20), for example whether application aid_1 or application aid_2 should be favoured. The resource 29 is then allocated appropriately. For example, referring to FIG. 10, if application aid_1 is favoured, then the final state of the resource 29B remains unchanged from its initial state 29A.

If, on the other hand, application aid_2 is favoured, then the allocation of resources to application aid_2 proceeds in the same way as if the non-interruptable flag had been set to False (steps s9 to s12), as reflected in the final state of the resource 29C shown in FIG. 10. The Don't care status shown for the flag NI in the final state of the resource 29 C indicates that this flag takes the value of the flag NI in the original Allocate request.

While a particular architecture has been described for sending information between the resources and the application manager via a system manager, it will be apparent that other architectures are also possible. For example, the conflict information can be sent directly from a resource to the application manager and back, without passing through the system manager.

To prevent unnecessary interaction with the user when two applications compete for several resources, a choice made between the applications during the first conflict resolution is cached and checked during the next resource conflict. The cache is cleared when the focus is switched, since a change in application priorities is then initiated. Alternatively, the cache is cleared periodically.

To maintain system stability, each resource 27, 28, 29 maintains a log of requests made by applications, together with the request status. If a fatal error causes any of the resources to crash, the system manager 30 recreates those resources, making the whole system more stable in respect of individual resource crashes. When a resource is restarted after an unexpected termination, it checks its log for pending requests. If it can complete the request, it does so, otherwise it informs the requesting application to give it the opportunity to recover from the unexpected event.

While the invention has been primarily described with reference to software running on a conventional computer, it is applicable to any computer-like or microprocessor based device having a number of resources which need to be supervised and managed by the system. In general terms, a resource is any software component which has a limitation on how other components may access it and which can only serve a limited number of clients at the same time. However, a resource can also be any device or hardware component on which the resource management strategies described above can be implemented.

The invention claimed is:

1. A computer-implemented method of resolving conflicts in the allocation of a shared computer resource between a first application to which the computer resource is currently allocated and a second application requesting access to the computer resource, comprising:
   receiving, at the computer resource, a resource allocation request that includes an identity for the second application;
   comparing, at the computer resource, the identity of the second application with an identity for a predetermined prioritized application to determine whether the second application is the predetermined prioritized application;
   in the event that the second application is the predetermined prioritized application, the computer resource determining whether it has the authority to allocate itself to the second application;
   in the event that the computer resource has the authority to allocate itself to the second application, the computer resource allocating itself to the second application; and
   in the event that the computer resource does not have the authority to allocate itself to the second application, the computer resource requesting a decision as to how to be allocated.

2. A computer-implemented method according to claim 1, wherein the decision depends on input from a user of the first and second applications.

3. A computer-implemented method according to claim 1, wherein the decision depends on predetermined priorities assigned to the first and second applications.

4. A computer-implemented method according to claim 1, wherein the decision comprises denying allocation to the second application.

5. A resource management system for allocating a shared computer resource between a plurality of applications requesting access to the computer resource, wherein, in determining the allocation of the computer resource between a first application to which the computer resource is currently allocated and a second application requesting access to the computer resource, the computer resource is configured:
   (a) to receive an identity for the second application,
   (b) to compare the identity of the second application to an identity of a predetermined prioritized application to determine whether the second application is the prioritized application, and in the event that the second application is the predetermined prioritized application,
   (c) to determine whether the computer resource has the authority to allocate itself to the second application, and (c) in the event that the computer resource has the authority to allocate itself to the second application,
   (d) to allocate itself to the second application, and
   (d) in the event that the computer resource does not have the authority to allocate itself to the second application,
   (e) to request a decision from a resource manager as to how to allocate itself.

6. A system according to claim 5, further comprising a focus controller for determining the application that is to be prioritized during resource allocation.

7. A system according to claim 5, further comprising an application manager for resolving a conflict in a request for the computer resource between first and second applications.

8. A system according to claim 7, wherein the conflict arises when both the first and second applications require ownership of the computer resource.

9. A computer program product; comprising:
   computer readable code embodied in a storage medium executable by a computer for implementing conflict resolution in the allocation of a shared computer resource between a first application to which the computer resource is currently allocated and a second application requesting access to the computer resource, including: program code arranged to compare an identity of the second application with an identity of a predetermined prioritized application to determine whether the second application is the predetermined prioritized application, in the event that the second application is the predetermined prioritized application, to determine whether the computer resource has the authority to allocate itself to the second application, and in the event that the computer resource has the authority to allocate itself to the second application to allocate the computer resource to the second application, and in the event that the computer resource does not have the authority to allocate itself to second application, to request a decision from a resource manager as to how to be allocated.

10. A system according to claim 5, wherein the decision depends on input from a user of the first and second applications.

11. A system according to claim 5, wherein the decision depends on predetermined priorities assigned to the first and second applications.

12. A system according to claim 5, wherein the decision comprises denying allocation to the second application.

13. A system according to claim 5, wherein the identity of the prioritized application is stored at the computer resource.

* * * * *

UNITED STATES PATENT AND TRADEMARK OFFICE
CERTIFICATE OF CORRECTION

PATENT NO. : 7,150,020 B2
APPLICATION NO. : 09/882459
DATED : December 12, 2006
INVENTOR(S) : Morteza Kalhour It is certified that error appears in the above-identified patent and that said Letters Patent is hereby corrected as shown below:

Column 7, Line 56:
Please delete "prioritized applicatior;" and insert --prioritized application;--

Column 8, Line 65:
Please delete "itself to second" and insert -- itself to the second--

Signed and Sealed this

First Day of May, 2007

JON W. DUDAS
*Director of the United States Patent and Trademark Office*